United States Patent [19]

Onda

[11] 4,206,379
[45] Jun. 3, 1980

[54] PERMANENT MAGNET ROTOR ASSEMBLY FOR ELECTRO-MECHANICAL TRANSDUCER

[75] Inventor: Mitsuo Onda, Fuchu, Japan

[73] Assignee: Citizen Watch Company Limited, Tokyo, Japan

[21] Appl. No.: 862,140

[22] Filed: Dec. 19, 1977

[30] Foreign Application Priority Data

Dec. 22, 1976 [JP] Japan .......................... 51-171954[U]
Aug. 26, 1977 [JP] Japan .......................... 52-113874[U]
Aug. 26, 1977 [JP] Japan .......................... 52-113875[U]
Nov. 16, 1977 [JP] Japan .......................... 52-152840[U]

[51] Int. Cl.² .......................................... H02K 21/12
[52] U.S. Cl. ........................................ 310/156; 310/43
[58] Field of Search .................. 310/156, 42, 40 MM, 310/43, 264–269; 29/596, 598, 609

[56] References Cited

U.S. PATENT DOCUMENTS 2,488,729 11/1949 Kooyman .............................. 310/156
3,436,570 4/1969 Engles ............................. 310/156 X
3,508,091 4/1970 Kavanaugh .......................... 310/156

FOREIGN PATENT DOCUMENTS 1360848 4/1963 France .................................... 310/156

Primary Examiner—Mark O. Budd

[57] ABSTRACT

A rotor assembly for an electro-mechanical transducer, which comprises a rotor pinion including a pinion and a shaft concentric with the pinion, the shaft having a first portion integral with the pinion and a second portion integral with the first portion, an annular body of a permanent magnet, and a protecting support member formed as a unitary structure with the annular body by injection molding, the protecting support member having an axially extending ring portion on which the annular body is mounted, end face portions radially extending from both ends of the ring portion and retaining both faces of the annular body, and an axial projection axially extending from one of the ends of the ring portion and press fitted to the second portion of the rotor pinion at a position beyond the one of the ends of the ring portion.

7 Claims, 8 Drawing Figures

PERMANENT MAGNET ROTOR ASSEMBLY FOR ELECTRO-MECHANICAL TRANSDUCER

This invention relates to rotor assemblies for electro-mechanical transducers, such as compact stepping motors, for use in electronic timepieces.

In recent years, magnets made of rare earth material have been used to construct rotors for electro-mechanical transducers. Although these magnets are capable of high performance, they are hard and extremely brittle. The methods which can be used to secure these magnets to a rotor pinion are thus very difficult to perform and limited in number. For example, a method in current use prescribes the utilization of a comparatively large-size retaining member made of metal disposed intermediate the rotor pinion and magnet in order to join them together and thus prevent the magnet from cracking. Such a structure is complicated and time-consuming to assemble and results in a rotor with a large moment of inertia. A large moment of inertia makes the rotor difficult to start and lengthens the time necessary to achieve a constant angular rotation. These factors require a wider driving current pulse width which has a detrimental effect upon battery life.

Although methods have been proposed in which moment of inertia is reduced by making use of a synthetic resin to secure the magnet to the rotor pinion, problems have been encountered in ensuring the securing force between these two members. When the synthetic resin is adopted, the rotor pinion is usually provided with projections or recesses that are brought into agreement with projections or recesses provided on the synthetic resin retaining member when the latter is press fitted upon the former, so that the securing force in the thrust and radial directions is established at an identical location. However, such a structure is disadvantageous in that it requires alignment and is difficult and time-consuming to machine.

Accordingly, an object of the present invention is to eliminate the above-mentioned defects and provide a readily machined and easily assembled rotor assembly for an electro-mechanical transducer, which rotor assembly is secured to a rotor pinion with sufficient securing force through the use of a synthetic resin which also enables a reduction in the moment of inertia.

Another object of the present invention is to provide a rotor assembly including a protecting support member formed into a unitary structure with a rotor magnet by injection molding.

A further object of the present invention is to provide a rotor assembly for a miniature electro-mechanical transducer, which is suited for mass production.

These and other objects, features and advantages of present invention will become more apparent from the following description when taken in conjunction with the accompanying drawings, in which.

Figure 1:
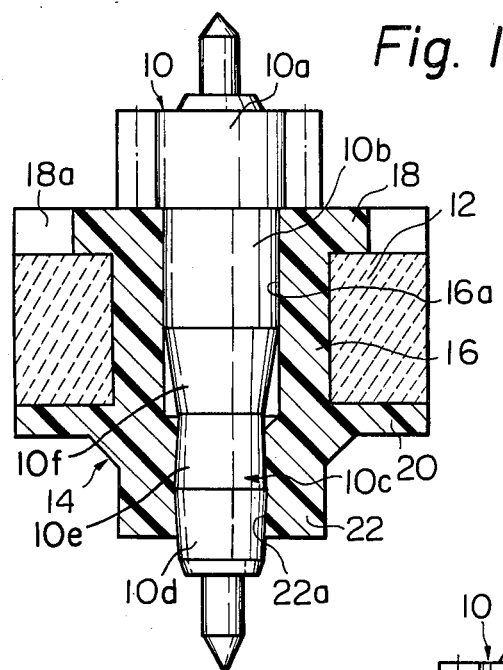
FIG. 1 is a cross sectional view of a preferred embodiment of a rotor assembly according to the present invention.

Referring now to FIG. 1, there is shown a preferred embodiment of a rotor assembly for an electro-mechanical transducer according to the present invention. The rotor assembly comprises a rotor pinion 10, an annular body 12 of a rotor magnet composed of a rare earth magnet compound such as $SmCo_5$, and a protecting support member 14 formed into a unitary construction with the annular body 12 by injection molding a high molecular substance. The rotor pinion 10 has a pinion 10a and a shaft having a first or large diameter portion 10b concentric with and connected to the pinion 10b and a second or small diameter portion 10c integral with the large diameter portion 10b and having reversely a tapered portion comprising a first portion 10d of increasing diameter, extending in from the free end of the shaft, and a second portion 10e of decreasing diameter. A further portion 10f of increasing diameter joins the small diameter portion 10c with the large diameter portion 10b of the shaft. The protecting support member 14 includes an axially extending ring portion 16 on which the annular body 12 is mounted, end face portions 18 and 20 radially extending from ends of the ring portion 16 and retaining faces of the annular body 12, and an axial projection 22 axially extending from one end of the ring portion 16 and having a tapered inner peripheral wall 22a. The protecting support member is mounted on the shaft by means of the axial projections 22 press fitted to the small diameter portion 10c of the shaft at a position beyond the end of the ring portion 16. Moreover, an inner peripheral wall 16a of the ring portion 16 is slidably fitted to the large diameter portion 10b of the shaft so that no force acts upon the annular body 12 when the axial projection is press fitted over the small diameter portion 10c, thereby eliminating the cause of cracking of the annular body 12. In addition, eccentricity of the annular body 12 with respect to the axis of the shaft is greatly restricted since the protecting support member 14 is positioned by the inner peripheral wall 16a slidably fitted to and guided by the larger diameter portion 10b. Indicated at 18a is a plurality of circumferentially spaced recesses formed in the face portion 18 to permit an upper mold cavity (not shown) to partially support the rotor magnet 12 to effect positioning thereof with respect to the support member 14 during injection molding thereof. The structure mentioned above is particularly effective in the case of mechanically weak materials, such as permanent magnets fabricated from $SmCo_5$ that easily crack when subjected to a force applied from an inward side. Further, a large-scale reduction in the moment of inertia of the rotor can be attained since the protecting support member is composed of a high molecular material.

In accordance with the present invention as described, the moment of inertia of a high-performance rotor magnet can be greatly reduced so that the rotor can be readily started. This allows driving current pulse width to be narrowed so as to extend battery life, and is particularly effective in permitting a sufficient high driving frequency to be obtained when rotating the rotor at a high speed. Finally, the fact that the rotor magnet and protecting support member possess a unitary construction greatly facilitates assembly.

Figure 2:
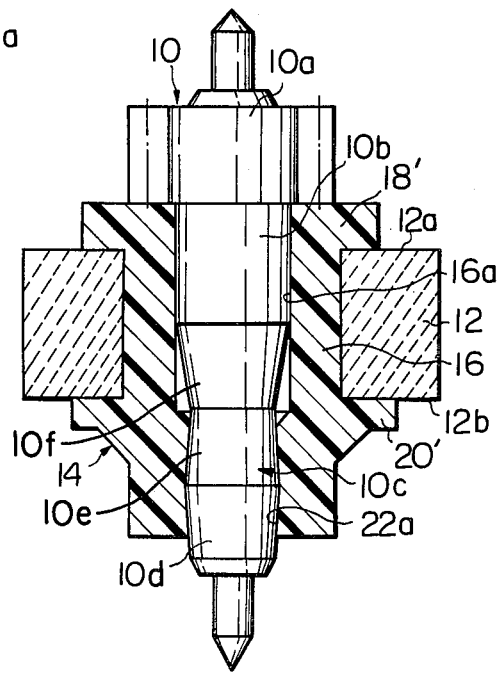
FIG. 2 is similar to FIG. 1, but shows a modification of the rotor assembly shown in FIG. 1.

FIG. 2 shows a modified form of the rotor assembly shown in FIG. 1, with like parts bearing the same reference numerals as thosed used in FIG. 1. In this modification, the face portions 18' and 20' are smaller in diameter than the annular body 12 such that the end faces 12a and 12b of the annular body 12 are partially exposed along their outer periphery in order to enhance positional precision at the time of the molding operation.

Figure 3:
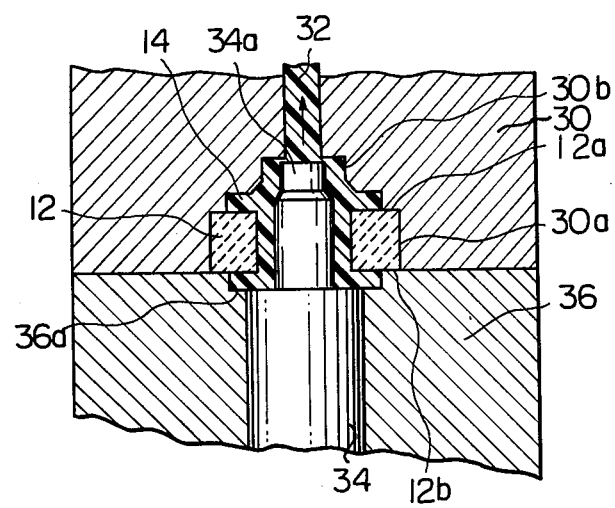
FIG. 3 is a cross sectional view of an example of a molding structure for injection molding a protecting support member as a unitary structure with a rotor magnet.

With reference to FIG. 3 which is a cross-sectional view of a mold and useful in explaining the molding means, an upper mold cavity 30 includes a guide portion 30a for the annular body 12, a recess 30b for forming the protecting support member 14, and a gate 32. A core pin 34 having a tip 34a for forming the internal configuration of the protecting support member 14 is loosely fit in a lower cavity 36 having an annular recess 36a. The protecting support member 14 is molded by inserting the annular body 12 in the upper cavity 30 and then injecting a molding resin from the gate 32. Next, the resin within the gate 32 is pulled upward in the direction of the arrow, the gate is cut off, and the upper cavity 30 is raised. Thereafter, lower cavity 36 is pushed upward while the core pin 34 is kept fixed, thereby allowing the annular body 12 to be removed from the mold together with the molded protecting support member 14.

During the molding operation, it is necessary that the upper and lower cavities 30 and 36 support the annular body 12 along the outer peripheral portions of both end faces 12a, 12b. In the absence of this support, the annular body 12 will undergo vertical displacement due to the pressure of the inflowing resin, and will be molded in an inclined attitude if there is a gap between the outer periphery of the annular body and the guide portion 30a of the upper cavity 30. As a result, the annular body 12 of the rotor magnet will experience a positional displacement which will reduce transducer performance when the completed rotor assembly is used in combination with the fitted rotor pinion. Although the present embodiment relates to an annular body of a rotor magnet of which both end faces 12a, 12b are supported along their entire outer periphery, it is obvious that partial peripheral support of the end faces is also possible.

Figure 4:
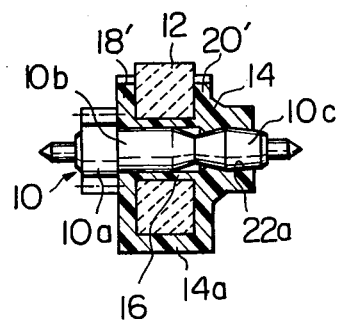
FIG. 4 shows a modification of the rotor assembly shown in FIG. 2.
Figure 5:
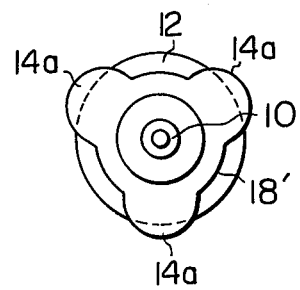
FIG. 5 is a top plan view of the rotor assembly shown in FIG. 4.

FIGS. 4 and 5 show respective cross-sectional and top views of a modification of a rotor assembly shown in FIG. 2. In this modification, the protecting support member 14 further has a plurality of bridge portions 14a extending between the face portions 18' and 20' at positions circumferentially spaced from one another and partially retaining the outer periphery of the annular body 12. The thickness of the bridge portions 14a is greater than that of an inner ring portion 16 so that the pressure of the inflowing resin that forms the ring portion 16 during the molding operation does not subject the outside of the rotor magnet 12 to an excessive cracking force even if a gap exists between the upper cavity 30 and the outer periphery of the rotor magnet. Moreover, since the outer periphery of each of the bridge-shaped resin portions 14a is small and formed in only three locations, the increase in the moment of inertia is not significant.

According to this structure, the protecting support member can be molded to incorporate the rotor magnet without the magnet experiencing any positional displacement.

Although the invention was described in terms of molding a protecting support member to a rotor magnet, it is obvious that the invention can also be applied to a case where the rotor magnet is attached by molding it directly to the rotor pinion.

Figure 6:
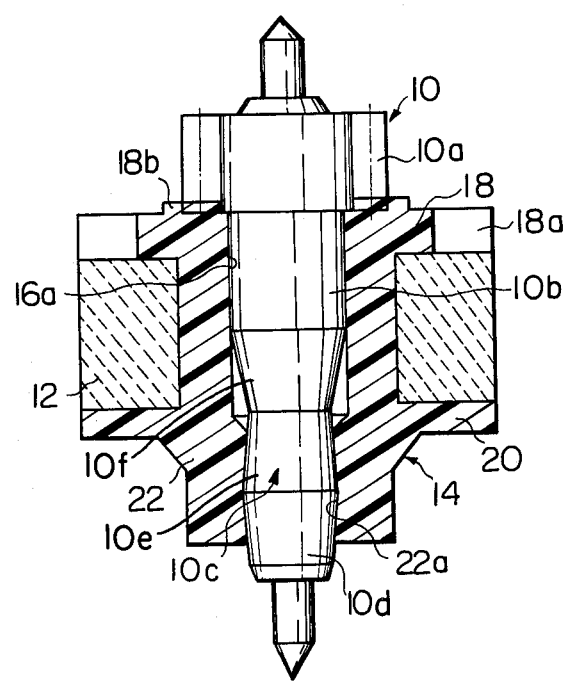
FIG. 6 shows still another modification of the rotor assembly shown in FIG. 1.

FIG. 6 shows another modified form of the rotor assembly shown in FIG. 1, with like parts bearing the same reference numerals as those used in FIG. 1. In this modification, the face portion 18 of the protecting support member 14 is formed at its front face with a plurality of circumferentially spaced projections 18b in mesh with gear tooth of the pinion 10a, so that rotation of the protecting support member 14 relative to the rotor pinion 10 is further prevented.

According to this structure, securing force between rotor pinion 10 and support member 14 in the direction of thrust is established at the location of the tapered inner wall 22a of the axial projection 22, while securing force against rotation is provided by the tooth of the pinion 10a meshing with the projections 18b.

Figure 7:
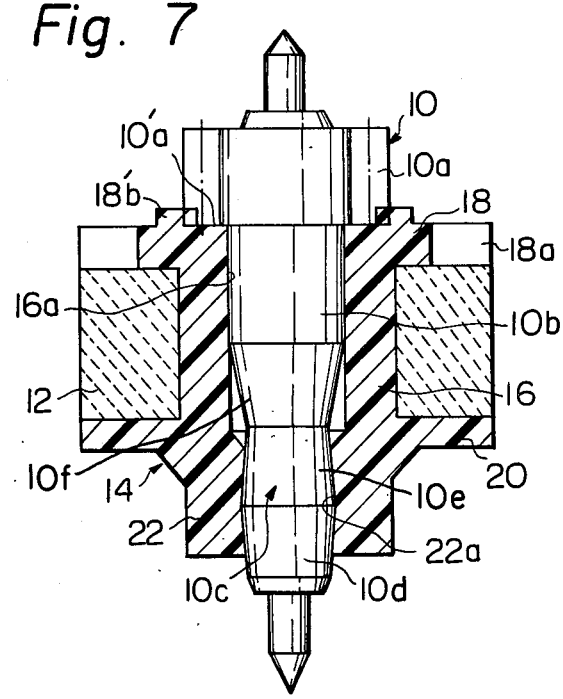
FIG. 7 shows a modification of the structure shown in FIG. 6.

FIG. 7 is a cross-sectional view of a modification of the rotor assembly shown in FIG. 6. In FIG. 7, the portions at which the projections 18'b of the face portion 18 are secured to the tooth of the pinion 10a are modified so as to be in engagement with the tip of the tooth of the pinion 10a only. In accordance with this structure, there is almost no change in the securing force against rotation of the support member 14, although the fact that the end face 18 of the support member 14 comes into abutting contact with the shoulder 10'a of the pinion during the press fitting operation makes it possible to prevent positional displacement of the rotor magnet 12 in the direction of thrust when excessive force is used to fit the protecting support member 14.

In accordance with the present invention as described, independent placement of the portions where the support member is secured to the pinion ensures securing force through an extremely simple structure that can be readily machined and assembled, and allows a reduction in the diameter of the rotor pinion, thereby making it possible to reduce the inner diameter of the rotor magnet. In addition, the use of a synthetic resin for the protecting support member enhances the positional accuracy of the rotor magnet and reduces its moment of inertia so that the efficiency of the transducer can be increased and the life of the battery extended.

Figure 8:
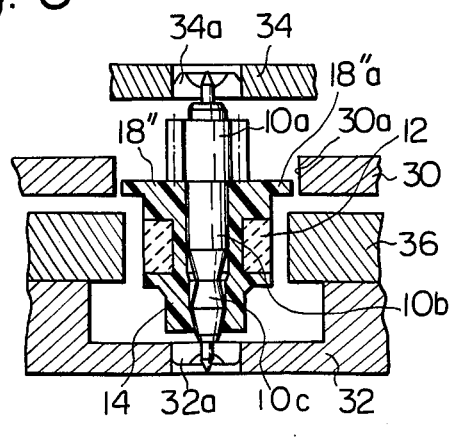
FIG. 8 shows a portion of an example of an electro-mechanical transducer incorporating a modified form of the rotor assembly shown in FIG. 1.

FIG. 8 shows a portion of an example of an electro-mechanical transducer incorporating still another modification of a rotor assembly according to the present invention. In FIG. 8, the face portion 18" of the protecting support member 14 has a radially extending annular flange portion 18"a, which is larger in diameter than the rotor magnet 12 and freely received in a bore 30a of a stopper 30 secured to a base plate 32. The base plate 32 has a bearing 32a by which one end of the rotor shaft is rotoatably supported while another end is rotatably supported by a bearing 34a of a bearing support 34. Indicated at 36 is a yoke of a stator. With the structure mentioned above, the inclination of the rotor assembly is prevented by the bore 30a of the stopper 30 during assembly of the electro-mechanical transducer so that the rotor magnet 12 is prevented from cracking due to contact with yoke 36 during assembly. This also makes it easy to assemble the electro-mechanical transducer.

While the present invention has been shown and described with reference to particular embodiment, it should be noted that various other changes or modifications may be made without departing from the scope of the present invention.

What is claimed is:

1. A rotor assembly for an electro-mechanical transducer, comprising:
   a rotor pinion unit including a pinion and a shaft concentric with said pinion, said shaft having a large diameter portion integral with and adjacent said pinion and a small diameter portion integral with said large diameter portion, said small diameter portion extending from said large diameter portion in a direction away from said pinion and including a tapered portion;
   an annular body of a permanent magnet formed of frangible material and having opposite end faces; and
   a protecting support member composed of a high molecular material and formed as a unitary structure with said annular body by injection molding, said protecting support member having an axially extending ring portion on which said annular body is integrally mounted and which fits on said large diameter portion of said shaft, end face portions radially extending from both ends of said ring portion and engaging both end faces of said annular body, and an annular axial projection extending axially from one end of said ring portion in a direction away from said pinion, said axial projection receiving said small diameter portion of said shaft and including a tapered inner wall portion into which said tapered portion of said rotor pinion shaft is press fitted at a position beyond said one end of said ring portion and remote from said annular body to secure said support member and annular body on said shaft, said annular axial projection having an area directly engaging said shaft to secure the two together and said ring portion being unexpanded by said shaft and thereby relieving said annular body of stress.

2. A rotor assembly according to claim 1, in which said ring portion of said support member is slidably fitted over said large diameter portion of the shaft without expansion.

3. A rotor assembly according to claim 1, in which said protecting support member also has a plurality of circumferentially spaced bridge portions extending between said end face portions to engage portions of the outer periphery of said annular body.

4. A rotor assembly according to claim 1, in which one of said end face portions has at its front face a plurality of circumferentially spaced projections in engagement with said pinion to secure said support member against rotation relative to said pinion and shaft.

5. A rotor assembly according to claim 4, in which said plurality of projections are in engagement with tips of teeth of said pinion.

6. A rotor assembly for an electro-mechanical transducer, comprising:
   a rotor pinion unit including a pinion and a shaft concentric with said pinion, said shaft having a large diameter portion integral with and adjacent said pinion and a small diameter portion integral with said large diameter portion, said small diameter portion extending from said large diameter portion in a direction away from said pinion and including a tapered portion;
   said tapered portion of said shaft comprising successively, in a direction from a free end of said small diameter portion of said shaft toward said pinion, a first portion of increasing diameter and a second portion of decreasing diameter;
   an annular body of a permanent magnet formed of frangible material and having opposite end faces; and
   a protecting support member composed of a high molecular material and formed as a unitary structure with said annular body by injection molding, said protecting support member having an axially extending ring portion on which said annular body is integrally mounted and which fits on said large diameter portion of said shaft, end face portions radially extending from both ends of said ring portion and engaging both end faces of said annular body, and an annular axial projection extending axially from one end of said ring portion in a direction away from said pinion, said axial projection receiving said small diameter portion of said shaft and including a tapered inner wall portion directly engaging said tapered portion of said rotor pinion shaft at a position beyond said one end of said ring portion and remote from said annular body to secure said support member and said annular body together whereby said ring portion is unexpanded by said shaft.

7. A rotor assembly according to claim 1, in which said reversely tapered portion of said shaft comprises successively, in a direction from a free end of said small diameter portion of said shaft toward said pinion, a first portion of increasing diameter and a second portion of decreasing diameter.

* * * * *